United States Patent [19]

Ball

[11] Patent Number: 4,804,115

[45] Date of Patent: Feb. 14, 1989

[54] PUMP CHAMBER DISPENSER

[75] Inventor: Martin F. Ball, Grove, United Kingdom

[73] Assignee: Metal Box p.l.c., Reading, United Kingdom

[21] Appl. No.: 188,298

[22] Filed: Apr. 29, 1988

[30] Foreign Application Priority Data

Apr. 29, 1987 [GB] United Kingdom ................. 8710192

[51] Int. Cl.⁴ ............................................. G01F 11/00

[52] U.S. Cl. ..................................... 222/209; 222/260; 222/376; 222/383

[58] Field of Search ................. 222/94, 129, 136, 137, 222/135, 145, 207, 209, 212, 213, 255–260, 380, 340, 341, 383, 385, 386, 387, 390, 391

[56] References Cited

U.S. PATENT DOCUMENTS

| | | | |
|---|---|---|---|
| 2,562,317 | 7/1951 | Krall | 222/207 |
| 2,789,731 | 4/1957 | Marraffino | 222/94 X |
| 2,905,364 | 9/1959 | Marraffino | 222/94 |
| 3,088,636 | 5/1963 | Spatz | 222/213 |
| 3,255,935 | 6/1966 | Spatz | 222/391 |
| 3,268,123 | 8/1966 | Spatz | 222/400.5 |
| 3,331,535 | 7/1967 | Jarvis | 222/94 |
| 3,361,305 | 1/1968 | Spatz | 222/207 |
| 3,486,663 | 12/1969 | Humphrey | 222/207 |
| 3,726,442 | 4/1973 | Davidson et al. | 222/207 |
| 3,752,366 | 8/1973 | Lawrence | 222/207 |
| 3,760,986 | 9/1973 | Castner et al. | 222/145 X |
| 3,768,705 | 10/1973 | Spatz | 222/213 |
| 3,786,963 | 1/1974 | Metzler, III | 222/136 |
| 3,820,689 | 6/1974 | Cocita | 222/207 |
| 3,866,800 | 2/1975 | Schmitt | 222/94 |
| 3,870,200 | 3/1975 | Spatz | 222/386 X |
| 3,986,644 | 10/1976 | Grogan et al. | 222/207 |
| 3,987,938 | 10/1976 | Cooprider et al. | 222/209 |
| 4,154,371 | 5/1979 | Kolaczinski | 222/212 |
| 4,211,341 | 7/1980 | Weyn | 222/94 |
| 4,301,948 | 11/1981 | Czech et al. | 222/341 |
| 4,308,977 | 1/1982 | Sigmund et al. | 222/386 X |
| 4,394,939 | 7/1983 | Thor et al. | 222/207 |
| 4,402,431 | 9/1983 | Wiegner et al. | 222/207 |
| 4,413,759 | 11/1983 | Mettenbrink | 222/213 |
| 4,421,255 | 12/1983 | Czech | 222/387 |
| 4,437,584 | 3/1984 | Connors | 222/137 |
| 4,437,591 | 3/1984 | von Schuckmann | 222/391 |
| 4,438,871 | 3/1984 | Eckert | 222/137 |
| 4,442,958 | 4/1984 | Amos | 222/213 |
| 4,461,403 | 7/1984 | Prahs | 222/129 |
| 4,474,313 | 10/1984 | Sieverding | 222/211 |
| 4,479,592 | 10/1984 | Rusing et al. | 222/391 X |
| 4,511,068 | 4/1985 | Bossina | 222/257 |
| 4,533,069 | 8/1985 | Drobish | 222/209 |
| 4,538,747 | 9/1985 | von Schuckmann | 222/260 |
| 4,564,130 | 1/1986 | Eulenburg | 222/207 |
| 4,565,306 | 1/1986 | Nakanishi et al. | 222/383 |
| 4,598,843 | 7/1986 | Foster et al. | 222/387 X |
| 4,609,130 | 9/1986 | Katva | 222/207 |
| 4,629,097 | 12/1986 | Moore | 222/386 X |
| 4,640,442 | 2/1987 | Drobish | 222/209 |
| 4,657,161 | 4/1987 | Endo et al. | 222/256 |
| 4,685,594 | 8/1987 | Czech | 222/383 X |
| 4,715,518 | 12/1987 | Moore | 222/386 X |
| 4,747,517 | 5/1988 | Hart | 222/137 |

FOREIGN PATENT DOCUMENTS

| | | | |
|---|---|---|---|
| 224907 | 6/1987 | European Pat. Off. | 222/383 |
| 3545743 | 6/1987 | Fed. Rep. of Germany | 222/391 |

*Primary Examiner*—Kevin P. Shaver

*Attorney, Agent, or Firm*—St. Onge Steward Johnston & Reens

[57] ABSTRACT

A pump chamber dispenser is arranged for producing a striped or otherwise striated product from two or more differently-colored product components held in its variable-volume reservoir (22). For each component the dispenser has at least one inlet port (20) to the pump chamber (21) and at least one exit port (44) for each inlet port. Having passed separately through the exit ports the components ae ducted by galleries (61) to the base of a dispensing spout (68), where they are recombined as desired to form the multicomponent product.

20 Claims, 2 Drawing Sheets

PUMP CHAMBER DISPENSER

This invention relates to dispensers for viscous or pasty products such as toothpaste, of the kind having a reduceable volume reservoir for the product, and a variable-volume pump chamber including a pump member which is operable by the user to draw product into the pump chamber from the reservoir, and subsequently expel the induced product from the pump chamber and through a suitable spout or other outlet for dispensing. For brevity, such a dispenser will hereinafter be referred to as a "pump chamber dispenser" throughout the specification and claims.

A feature which may be commercially desirable for a pump chamber dispenser, particularly for a toothpaste product, is its ability to dispense the product in well-defined stripes or sections of differently-colored components. Hitherto, the only proposal known to applicants for providing this feature in a pump chamber dispenser has involved ducting a secondary product component to exit ports located adjacent the discharge orifice by which a differently-colored primary or 'bulk' product component passes for dispensing. This arrangement is shown and described in UK patent publication No. 2161222A from which it will be understood that the secondary component is held in specially provided chambers having the exit ports formed in their top ends and open at their bottom ends to the pump chamber. As dispensing proceeds the primary component progressively displaces the secondary component from the secondary chambers so that eventually, when the dispenser is approaching product exhaustion, only the primary component will be dispensed; alternatively, the dispenser may become exhausted with the secondary chambers still holding an inaccessable residue of product. In addition, the requirement to fill the dispenser with the two components separately involves a two-stage filling operation and for that reason is undesirable.

The present invention seeks to provide a pump chamber dispenser which, with suitable arrangement, may be filled with a two (or more) component product in a single filling operation and furthermore is capable of maintaining the desired relationship of the components in the product without substantial product residue until substantially all the product has been dispensed.

According to the invention from a first aspect there is therefore provided a pump chamber dispenser for a viscous or pasty product, which comprises a reducable volume reservoir for the product, a variable volume pump chamber including a pump member which is operable by the user to draw product into the pump chamber from the reservoir and subsequently expel the induced product from the pump chamber for dispensing, the pump chamber having associated inlet and exit valves for controlling product flow therethrough, wherein the dispenser is adapted for dispensing the product as a multicomponent product formed of a plurality of adjacent but individual product components supplied from the reducable volume reservoir, the components being held in the reservoir individually but in mutual contact at one or more interfaces which extend longitudinally of the reservoir in relation to the product flow therefrom for dispensing, for each said product component there being at least one inlet port closed by a said inlet valve and arranged, in relation to the product in the reservoir, to pass the said product component only, and at least one exit port closed by a said exit valve and positioned, in relation to the or each respective inlet port, to pass only the said product component passed by the inlet port, the dispenser further including duct means arranged for receiving the individual product components from the exit ports and for recombining them as the said multicomponent product for dispensing.

This and other aspects and features of the invention will become apparent from the following description of embodiments of the invention, now to be given, by way of example only, with reference to the accompanying drawings. In the drawings.

Figure 3:
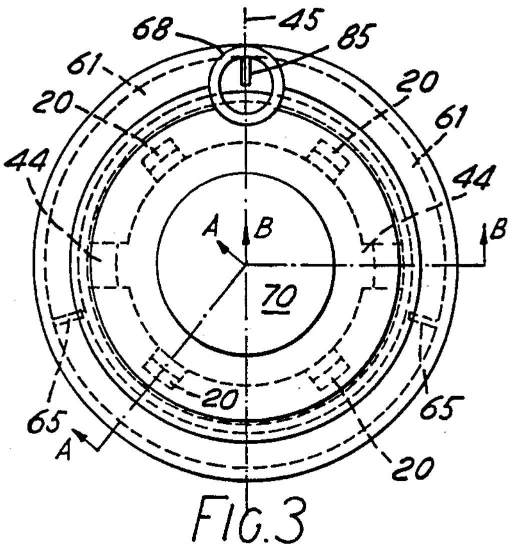
Figure 4:
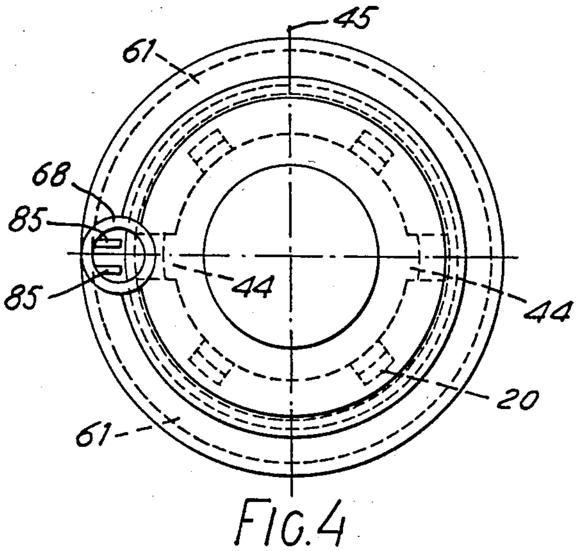
Figure 5A:
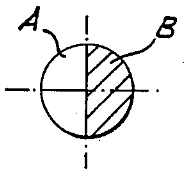
Figure 5B:
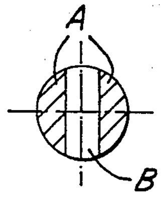
Figure 5C:
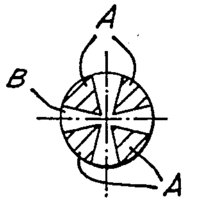

FIG. 3 correspondingly shows the container body with the cover and pump member in position:

FIG. 4 is a plan view corresponding to FIG. 3 of a second pump chamber dispenser in accordance with the invention; and FIGS. 5A, 5B and 5C are cross-sectional views respectively showing the configuration of the multicomponent product produced by the dispensers of FIGS. 1 to 3 and FIG. 4, and by a further dispenser which is otherwise not illustrated.

Figure 1:
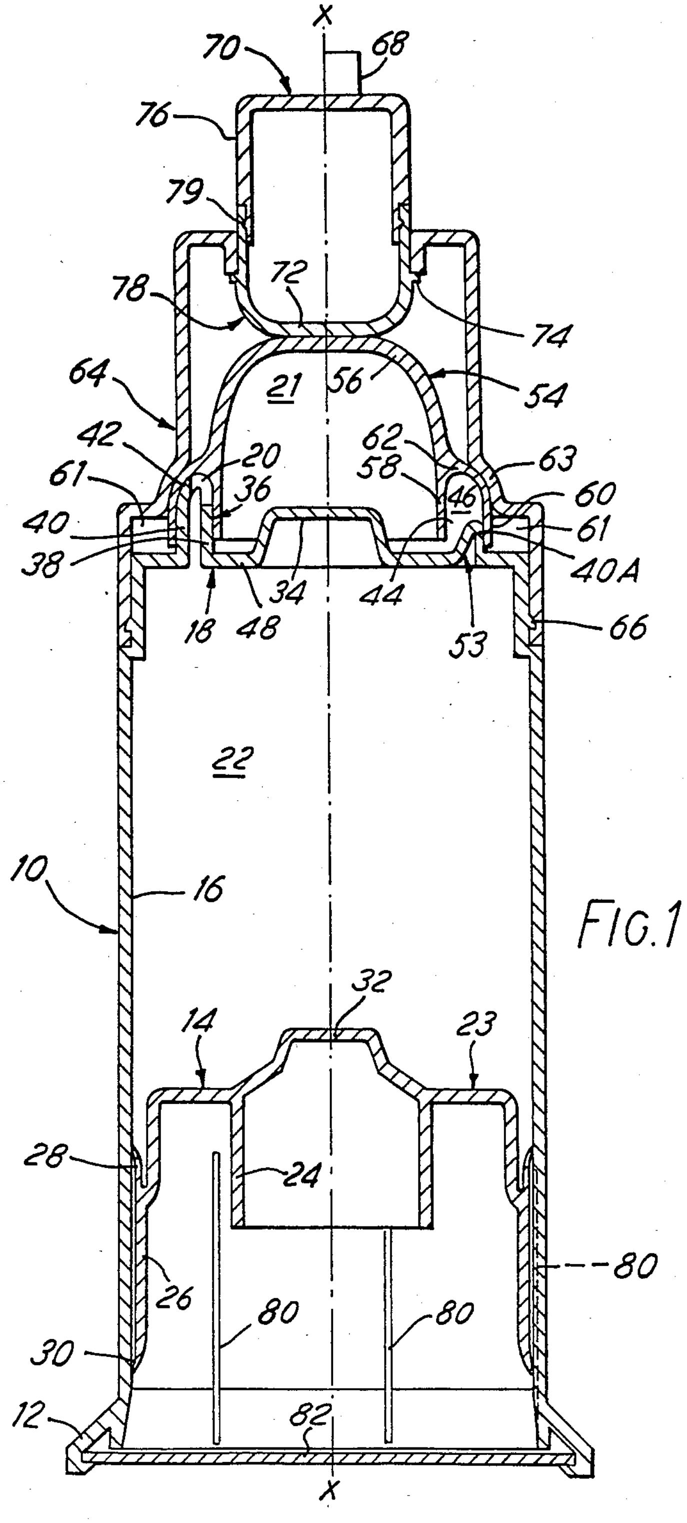
FIG. 1 shows a pump chamber dispenser in accordance with the invention, as seen on a central vertical section taken partly on the radial plane A—A of FIG. 3 and partly on the radial plane B—B of that figure.

Referring now FIG. 1 of the drawings, a pump chamber dispenser for toothpaste or like viscous or pasty product formed of two differently coloured components in equal quantities has an injection-molded plastics body 10 arranged to stand upright on a flared standing rim 12 at its bottom end as shown. Above the rim the body is cylindrical and receives an injection-molded plastics follower piston 14 which is slidable along its bore 16. The top end of-the body is integrally closed by a contoured closure panel 18. The closure panel 18 is formed with four apertures 20 forming inlet ports for the pump chamber 21 of the dispenser as is later to be described. One only of these inlet ports 20 is visible in FIG. 1, to the left of the centerline XX.

The body 10 and the follower piston 14 together form a reducable-volume reservoir in which the two-component product is held and which is denoted generally by reference numeral 22.

The follower piston 14 comprises a central panel 23 formed on its underside with a stiffening collar 24 which also assists the initial insertion of the piston into the body after filling with product. For engaging the body bore 16 the piston has a flexible skirt 26 which is carried from the periphery of the central panel 23 and has leading and trailing feather edges 28, 30 which engage the bore 16 resiliently so as to prevent any leakage of air past the piston from outside when the pump chamber 21 is being recharged with product after a dispensing stroke. At its centre the panel 23 is formed with a boss 32 which is complementary to a corresponding boss 34 of the body closure panel 18 so as to minimise the amount of product residue left in the empty dispenser underneath the boss 34.

Figure 2:
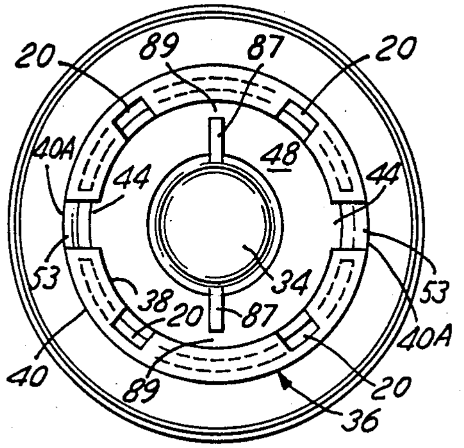
FIG. 2 is a plan view of the body of the dispenser, with the cover and pump member omitted to reveal detail of the closure panel of the body.

As can also be seen in FIG. 2 which shows it in plan view from above, the body closure panel 18 has a plane, generally annular floor 48 from which the central boss 34 projects; it also has a further, generally annular but interrupted, upstanding projection 36 which extends concentrically around the boss 34. The projection 36 is hollow; moreover, it is downwardly open to the product reservoir 22. From the left hand side of FIG. 1 it will be seen to have inner and outer concentric cylindrical walls 38, 40 and a rounded top wall 42. It therefore has the general form of an annular inverted channel of U-shaped cross-section.

The previously mentioned inlet ports 20 are each formed in the projection 36 at the junction of its inner wall 38 and rounded top wall 42. They are equally spaced at 90° intervals around the central axis of the projection, and are operatively associated in pairs with two diametrically disposed discontinuities 44 at which the projection is substantially interrupted. As will become apparent, each discontinuity is located centrally in relation to the two inlet ports with which it is associated.

The arrangement of the closure panel 18 at the discontinuities 44 can be understood from the right hand side of FIG. 1 in combination with FIG. 2. At each discontinuity the ends of the projection 36 are substantially closed by end walls 46, of which one is visible full-face in FIG. 1. Between the end walls there extends a shallow and radially narrow continuation 53 of the projection 36, including a shallow portion 40A of the outer wall 40. The continuations 53 thus form sills over which product can pass for dispensing as is later described, the discontinuities accordingly providing exit ports for the pump chamber 21.

Referring again to FIG. 1, the part of the closure panel 18 comprised of the boss 34 and the floor 48 forms the base of the pump chamber 21 for the dispenser. The pump chamber is otherwise formed by a unitary pump member 54 which is moulded from a suitable elastomeric material such as silicon rubber. As can clearly be seen in FIG. 1, the member 54 comprises a central dome 56 generally of hemispherical shape and overlying the boss 34 and the floor 48, and a bifurcated depending skirt formed of inner and outer radially spaced, continuous skirts 58,60. In the interests of clarity the bifurcated skirt as such is not individually referenced. The skirts 58, 60 are integrally joined at their top edges by a rounded portion 62 of the pump member, which is moulded to conform in cross-section to the rounded top wall 42 of the projection 36.

The pump member 54 is loosely assembled to the body 10 as shown, with its inner skirt 58 closely adjacent the inner wall 38 of the projection 36, with its outer skirt 60 closely adjacent the outer wall 40 of the projection, and with its rounded portion 62 in close conformity with the top wall 42 of the projection. The bifurcated skirt of the pump member 54 thus separately closes not only the inlet ports 20 but also the exit ports 44. At least in the locality of each exit port 44 the free edge of the outer skirt 60 is spaced above the floor 48 so that the exit port is in communication with the pump chamber to enable product to pass for dispensing.

A molded plastics cover 64 is snap-engaged permanently onto the body 10 and retained there by a peripheral bead 66. It encloses the pump member 54 so as substantially to prevent inadvertent operation of the dispenser, and provides an upstanding hollow spout 68 through which product may leave the dispenser for deposition onto, for example, a toothbrush. It has a rounded annular portion 63 which engages the pump member around the top edge of the projection so by clamping it against the projection 36 to hold the bifurcated skirt in the required position to properly perform its inlet and exit valve functions.

As can be seen from FIG. 3, peripherally of the dispenser the spout 68 is located midway between the two exit ports 44. The cover is also molded to form two identical half-periphery galleries 61 (FIG. 1) which extend around the dispenser radially outside the outer skirt 60 of the pump member 54, so as to connect the exit ports individually with the base of the spout. The floors of the galleries are provided by the closure panel 18 of the container body, and vertical blanking plates 65 (FIG. 3) are molded in the cover and positioned to close off the galleries beyond the exit ports in relation to the spout.

The dispenser is arranged to be operated by finger pressure of the user, and accordingly has a molded plastics piston actuator 70 held captive for vertical sliding movement by the cover 64, with its rounded lower end 72 in central engagement with the top of the dome 56 of the pump member 54, and with its upper end accessable to the user. By virtue of its natural resilience, the pump member biasses the actuator upwardly against an annular limit stop 74 which defines the retracted, non-operative position of the actuator as shown. For ease of molding, the actuator is formed of upper and lower parts 76, 78 which are snap-engaged together and secured by a bead 79 on the upper part.

The dispenser is filled with the two-component product through the bottom end of the body 10 with the follower piston 4 absent. The two components are simultaneously charged into the body side-by-side and in equal quantities, the interface 45 (FIG. 3) which they form between them lying on the diametral plane on which the spout 68 lies, and accordingly being perpendicular to the common plane of the exit ports 44.

Following product filling the piston 14 is pushed into the body and up to the product, suitable means, e.g. longitudinally extending grooves 80 formed along the base 16 at the lower end of the body, being provided for venting the body of trapped air as the piston 14 is being inserted. If desired, one or more priming operations of the actuator may be performed at this stage.

For use, the consumer depresses the actuator 70 repreatedly as required, so as to dispense metered amounts of the product through the spout 68. On each downward stroke of the actuator the dome 56 of the pump member 54 is compressed, so pressurising product already in the pump chamber 21. Product is therefore forced from the pump chamber into the discontinuities 44 of the projection 36; at each discontinuity it then forces the outer skirt 60 of the pump member locally away from the shallow wall portion 40A of the sill and passes into the associated gallery 61. During this time the inner skirt 58 closes each of the inlet ports 20 against any escape of product back into the product reservoir, it being understood that the greater the pressure of product in the pump chamber the more firmly the inner skirt will be forced against the projection 36 to form the desired seal against product flow in the reverse direction.

The boss 34 ensures a free passage for product to enter the discontinuities 44 around the whole periphery of the dispenser, by limiting the possible compression of the pump member by the user. If desired, for different applications, the height of the boss 34 may be varied to change the volume of product delivered by each operation of the dispenser.

After each dispensing stroke the user releases the actuator 70, whereupon the pump member 54 reverts resiliently to its original shape, thereby forcing the actuator upward to its retracted position shown and at the same time creating a subatmospheric pressure in the pump chamber. This reduced pressure creates a differential pressure across the inner skirt at the four inlet ports 20, so forcing the skirt to move locally away from the projection 36 in a radially inward direction and allowing product to pass beneath the inner skirt and to enter the pump chamber from the product reservoir.

In this way the pump chamber is replenished with product from the product reservoir. Any substantial "suck-back" of product down the spout 68 during this time is prevented by sealing engagement of the outer skirt 60 with the wall portions 40A of the projection 36, although a small degree of suck-back may be desirable to prevent dribbling.

In known manner the piston 14 is forced by atmospheric pressure to move along the body so as to remain in full contact with the product as dispensing proceeds. If desired, a board or plastics disc 82 may be snap-engaged into the standing rim 12 as shown so as to prevent dust and other foreign matter from entering the body behind the piston.

As previously mentioned, the product to be dispensed is charged into the container body with the interface between its two differently-colored components lying substantially symmetrically in relation to the two exit ports 44. Applicants have surprisingly found that, even though no positive separation exists between the components in the reservoir 22, the product as it is delivered to the two galleries 61 by the pumping action of the pump member 54 is segregated into its two product components, one gallery therefore serving for one component and the other gallery serving for the second component. This segregation, which shows a remarkable degree of consistency throughout dispensing, enables the two components to be recombined in many different ways. In the first embodiment (FIGS. 1 to 3) the galleries converge at the dispensing spout 68 as previously described; as shown in FIG. 5A, the product components are therefore recombined at a generally plane interface to form a dispensed product stream essentially having the same transverse form as the product lying in the reservoir 22. In FIG. 5A one component is referenced A, and the other is referenced B.

At the end of dispensing, when the follower piston 14 comes into abutment with the underside of the closure panel 18, the seals provided at the inlet and exit ports 20, 44 by the pump member 54 enable the pump member to operate as an air pump. Any product in the channels 61 is therefore expelled by normal dispensing operation by the user, and the amount of inaccessible residue of product remaining when dispensing is no longer possible is small. Furthermore, the desired composition of the two components in the dispensed product is substantially maintained right up to the product exhaustion.

In a possible modification of the dispenser of FIGS. 1 to 3 a well is formed in the floor 48 of the pump chamber 21 at each discontinuity 44. This arrangement enables the inner skirt to be increased in length so as to terminate just above the floor, without closing off the exit ports from the pump chamber. As a further alternative, the inner skirt is slit or cut away in the locality of each discontinuity. This not only allows or assists communication of the exit ports with the pump chamber, but it is also believed to discourage mixing of the two product components in the pump chamber, by encouraging them individually to move towards the respective discontinuties on entry to the pump chamber from the inlet ports.

FIG. 4 is a view corresponding to FIG. 3 of a second pump chamber dispenser which has the same body 10 and product filling as the first dispenser but of which the cover has its galleries 61 arranged to recombine the components as a sandwich, that is to say, with one component B interposed between two separate but equal portions of the second component A (see FIG. 5B). It will be seen from FIG. 4 that this recombination is achieved by disposing the spout 68 on the diametral plane of the exit ports, and by arranging one exit port to discharge directly into the spout and the other to supply its product component to the spout via a branched path formed of two half-peripheral galleries 61 acting in parallel. Preferably, and as shown in FIGS. 3 and 4, a barrier plate or barrier plates 85 is or are molded on the cover 64 at the base of the spout where the product components converge, so as to discourage component movement between the galleries at the beginning of a dispensing operation, before steady-state flow conditions have been established. A similar function may be provided within the pump chamber 21 by further, aligned barrier plates 87 (FIG. 2) which are molded to project upwardly from the floor 48 of the closure panel on either side of the boss 34, in coplanar alignment with the interface 45 of the product components in the reservoir 22. Preferably, as shown, these further barrier plates 87 make, clearances 89 with the projection 36, through which the inner skirt 58 of the pump member 54 may extend without interruption. In height the barrier plates are conveniently the same, or slightly shorter than, the boss 34.

If desired for aesthetic effect, the one or more barrier plates 85 may be inclined to the product flow by a small angle so as to impart a spiral twist to the product being dispensed.

In a further embodiment of the invention the same spatial relationship of the exit ports 44 to the spout 68 is used as is used in FIG. 1. However, the recombination of the product components differs, the product configuration being now as shown in FIG. 5C and having equal segments of a component A—(four segments being shown)—spaced regularly around a matrix of the second component B. To achieve this configuration a stream of component B is received from the respective gallery from where it passes along a passage to the base of the spout. The passage has four apertures in its wall corresponding in angular position to the segments of component A in the product stream to be dispensed. An annular passage fed with component A is formed around the apertured passage so that, as component B moves along the latter, component A is extruded onto it as the desired segments.

It will be understood from the foregoing that the pump member 54 provides not only for pumping product from the associated product reservoir to the dispensing spout of the dispenser, but it also provides flap valves by which the inlet and exit ports of the pump chambers are controlled. By suitable choice of the individual thicknesses of the pump member at its dome portion and at its inner and outer skirts, the ability of the pump member to perform the different functions required of it can be optimised, and the dispenser can be adapted for products having widely different flow characteristics. Moreover, the pump member is of simple shape and is correspondingly cheap to mold; preferably, it is rotationally symmetrical so as not to require angular orientation before assembly.

Although for aesthetic and/or functional reasons it is prefered that an actuator should be provided, within the scope of the invention are pump chamber dispensers having no actuator but arranged instead to be operated by direct action of the user on the pump member.

The pump member of a dispenser according to the invention may have other configurations other than the particular configurations shown and described for the pump member 54. If desired, the pump member may be a piston arranged to act within a cylinder and biassed by a spring to its retracted position. One possible dispenser in accordance with the invention has a pump member which is similar to the pump member 54 but which has only one skirt. Different parts of the periphery of this skirt are arranged to provide inlet and exit valves for the pump chamber.

It is to be understood that the inlet and/or the exit valves need not form an integral part of the pump member, but may be provided separately.

Whilst in the described embodiments one exit port and two inlet ports, disposed symmetrically in relation to the exit port, are provided for the pump chamber for each product component, if desired two or more exit ports or one, three or more inlet ports may be provided for an individual component of the product in the reservoir. For example, as one possibility a product component in the reservoir has two associated exit ports spaced peripherally around the pump chamber, and a single inlet port disposed midway between the two exit ports and serving the two exit ports equally. It will thus be understood that considerable variation of the configuration or make-up of the dispensed product can be achieved by suitable selection of the numbers and positioning of the inlet and exit ports, the size of the individual component fills into the reservoir, and the arrangement of the ducting by which the individual component flows are recombined after leaving the pump chamber.

In the embodiments described and shown above the product components are filled into the product reservoir in equal quantities and correspondingly are present in equal quantities in the product as dispensed. However, from the preceding paragraph it will be understood that the proportion of a particular component in the dispensed product may be varied at will by corresponding variation of the fill of the component into the reservoir and by suitable arrangement of the inlet and exit ports and the recombining ducting. Only two product components may be used as particularly described, although three or more components are possible.

Pump chamber dispensers in accordance with the invention may require no component parts in addition to those required for an equivalent dispenser for a single-component product. They may be arranged for easy filling and assembly, and a single body molding may be made to serve for dispensers producing different product configurations by use of different covers with appropriate ducting configurations. For example, one cover may be arranged to duct a particular component from two exit ports to form separate parts of the dispensed product, whereas another cover arranged for attachment to the same body may be arranged to recombine the flows from those exit ports so that they appear as one in the dispensed product.

To further exemplify the adaptability of the dispensers for different products, it is pointed out that they may, if desired, be used for dispensing a single-component product filled into the reservoir; this is irrespective of their capability for dispensing two or more components as described above.

I claim:

1. A pump chamber dispenser for a viscous or pastry product formed form two or more components comprising:

a reservoir for the product;

a pump member defining a variable volume pump chamber, wherein said pump member is operably connected to said reservoir to withdraw product from said reservoir into the pump chamber and subsequently to expel product from the pump chamber;

a plurality of inlet and outlet valves associated with the pump chamber for controlling flow of product into and out of the pump chamber by opening and closing inlet and exit ports, respectively, wherein, for each component in said reservoir, at least one inlet valve and at least one output valve are positioned with respect to said reservoir to permit each component, when stored in said reservoir separately but in mutual contact along at least one interface parallel to the direction product is withdrawn from said reservoir, to pass separately through at least one inlet port and to be separately withdrawn from the pump chamber through at least one exit port; and duct means positioned to receive each component separately from the exit ports of the pump chamber and configured to recombine the separate components as a multicomponent product or dispensing.

2. A pump chamber dispenser according to claim 1, wherein the inlet and exit ports are distributed peripherally around the pump chamber and each exit port is located between a respective pair or inlet ports.

3. A pump chamber dispenser according to claim 1 further comprising:

barrier means located within the pump chamber to shield the inlet and exit ports for each product component from the other inlet and exit ports.

4. A pump chamber dispenser according to claim 1, wherein said pump member moves in an operative direction and is substantially circular in cross-section in a plane transverse to the operative direction, the exit ports open substantially radially from the pump chamber, and said duct means comprises arcuate passages extending peripherally around the pump chamber.

5. A pump chamber dispenser according to claim 1 further comprising:

a follower piston within said reservoir which is advanced toward said pump member when said pump member is released from a depressed state.

6. A pump chamber dispenser according to claim 1, wherein the pump member comprises a unitary member of elastomeric material including flexible, integral portions forming said inlet and exit valves, said pump member cooperates with a substantially rigid wall portion to enclose said pump chamber, said wall portion being an end closure panel for and end of said reservoir and having apertures defining the inlet ports for communicating between said reservoir and the pump chamber, and the closure panel incorporating means defining the exit ports, and further comprising:

a cover member fitted over said pump member and the closure panel to maintain said pump member operatively engaged with the closure panel and to define said duct means with the closure panel.

7. A pump chamber dispenser according to claim 6, wherein said pump member comprises a dome portion and two coaxial skirts extending from the edge of the dome and respectively forming said inlet and outlet valves for the inlet ports and the exits ports, the closure panel having an integral annular projection engaged by the skirts, the inlet ports opening through the projection, and the projection having interruptions therein defining the exit ports.

8. A pump chamber dispenser according to claim 7, wherein the two coaxial skits comprise an inner skirt and an outer skirt surrounding the inner skirt, the inner skirt forming said plurality of inlet valves, and the outer skirt forming said plurality of outlet valves, whereby, upon depression of said pump member, said plurality of inlet valves close their respective inlet ports and said plurality of outlet valves move away from their respective exit ports to expel product, and, upon release of said pump member, said plurality of outlet valves close their respective exit ports and said plurality of inlet valves move away from their respective inlet ports to draw product into the pump chamber.

9. A pump chamber dispenser according to claim 1 further comprising:

a tube means for discharge of the multicomponent product, said tube means being connected to said duct means and means for guiding the product components into said tube means from said duct means to produce a desired distribution of the product components within a cross-section of the multicomponent product dispensed.

10. A pump chamber dispenser according to claim 9, wherein the number of said inlet valves and outlet valves and the number of the inlet and exit ports permit the two products to be dispensed.

11. A pump chamber dispenser according to claim 10, wherein there is one said outlet valve with one respective exit port for each product with each said outlet valve and its respective exit port being equidistant from said tube means, whereby the components are dispensed in side-by-side fashion along a planar interface.

12. A pump chamber dispenser according to claim 10, wherein there is one said outlet valve with one respective exit port for a first product and one said outlet valve with one respective exit port and two said duct means for a second product, said outlet valve and the respective exit port for the first product being proximate said tube means and said outlet valve and its respective exit port for the second product being distal from said tube means with each of said duct means for the second product terminating at spaced apart sides of said tube means, whereby the components are dispensed in side-by-side fashion along two planar interfaces with the first component being sandwiched between the second component.

13. A pump chamber dispenser for a viscous or pastry product formed from two or more components comprising:

a tubular body;

an end wall panel integral with said tubular body to define partly a closed reservoir chamber for the viscous or pastry product to be dispensed;

a plurality of inlet ports extending through said end wall panel to communicate with the reservoir, wherein, for each component in said tubular body, at least one inlet port is positioned with respect to the reservoir to permit each component, when stored in the reservoir in mutual contact along at least one interface parallel to the direction product is withdrawn from the reservoir, to pass separately through at least one inlet port;

a plurality of exit ports in said end wall panel, wherein for each component in said tubular body, at least one exit port is positioned with respect to said end wall to permit each component to pass separately through at least one exit port;

a pump member of elastomeric material on said end wall panel outside the reservoir chamber, said end wall panel and said pump member defining a variable volume pump chamber, wherein said pump member comprises:

a dome-shaped portion;

an outer skirt extending from the dome-shaped portion over and against said plurality of exit ports; and valve means extending downwardly from the dome-shaped portion over and against said plurality of inlet ports;

a passage connecting said plurality of inlet ports and the reservoir chamber, whereby release of the dome-shaped portion from a depressed state conveys viscous or pastry material from the reservoir chamber through said passage and the inlet port, past the valve means, and into the pump chamber; and duct means positioned to receive each component separately from said exit ports and configured to recombine the separate components as a multicomponent product for dispensing, whereby depression of the dome-shaped portion of said pump member pushes each component separately from the pumping chamber through at least one of said outlet ports, past the outer skirt, and into said duct means where the separate components are combined.

14. A pump chamber dispenser according to claim 13 further comprising:

a follower piston within the reservoir which advances toward end wall panel upon release of said pump member from its depressed state.

15. A pump chamber dispenser according to claim 13 further comprising:

a cover member attached to said body and defining a discharge nozzle, the cover member being arranged to enclose said pump member and being movable for depressing the domed portion to reduce the volume of the pumping chamber and to effect dispensing.

16. A pump chamber dispenser according to claim 15, wherein said cover member is integral with and attached to said tubular body.

17. A pump chamber dispenser according to claim 13, wherein the valve means comprises:

an inner skirt extending downwardly from the dome-shaped portion radially inwardly of the outer skirt.

18. A pump chamber dispenser according to claim 17, wherein the inner skirt extends continuously between the pumping chamber and said plurality of exit ports but said plurality of exit ports communicate with the pumping chamber at a level below the inner skirt.

19. A pump chamber dispenser according to claim 17, wherein each of the skirts extends from the dome-shaped portion non-convergently and substantially parallel to the longitudinal axis of the body.

20. A pump chamber dispenser for a viscous or pastry product formed from two or more components comprising:

a tubular body;

an end wall panel integral with said tubular body to define partly a closed reservoir chamber for the viscous or pastry product to be dispensed;

a plurality of inlet ports extending through said end wall panel to communicate with the reservoir, wherein, for each component in said tubular body, at least one inlet port is positioned with respect to the reservoir to permit each component, when stored in the reservoir in mutual contact along at least one interface parallel to the direction product is withdrawn from the reservoir, to pass separately through at least one inlet port;

a plurality of exit ports in said end wall panel, wherein for each component in said tubular body, at least one exit port is positioned with respect to said end wall to permit each component to pass separately through at least one exit port;

a pump member of elastomeric material mounted on said end wall panel outside the reservoir chamber, said end wall panel and said pump member defining a variable volume pump chamber, wherein said pump member comprises:

a dome-shaped portion;

an outer skirt extending from the dome-shaped portion over and against said plurality of exit ports; and an inner skirt extending downwardly from the dome-shaped portion radially inwardly of the outer skirt;

a passage connecting said plurality of inlet ports and the reservoir chamber, whereby release of the dome-shaped portion from a depressed state conveys viscous or pastry material from the reservoir chamber through said passage and the inlet port, past the inner skirt, and into the pump chamber;

duct means positioned to receive each component separately from said exit ports and configured to recombined the separate components as a multi-component product for dispensing, whereby depression of the dome-shaped portion of said pump member pushes each component separately from the pumping chamber through at least one of said outlet ports, past the outer skirt, and into said duct means where the separate components are combined;

a discharge nozzle connected to said duct means; and a follower piston within the reservoir which advances toward end wall panel upon release of said pump member from its depressed state.

* * * * *